July 27, 1965 S. O. LINDERHOLM 3,197,551
CABLE TERMINALS WITH SHIELDING CAPACITORS
Filed Aug. 19, 1960 2 Sheets-Sheet 1

INVENTOR.
SVEN O. LINDERHOLM
BY
ATTORNEYS.

INVENTOR.
SVEN O. LINDERHOLM
ATTORNEYS.

United States Patent Office 3,197,551
Patented July 27, 1965

3,197,551
CABLE TERMINALS WITH SHIELDING CAPACITORS
Sven O. Linderholm, Ludvika, Sweden, assignor to The Ohio Brass Company, Mansfield, Ohio, a corporation of New Jersey
Filed Aug. 19, 1960, Ser. No. 50,675
6 Claims. (Cl. 174—73)

This invention relates to capacitive voltage dividers and stress distributing apparatus.

An object of the invention is to provide improved structures in which voltage division is accomplished by grading capacitors.

A further object of the invention is to avoid the effect of stray fields and to avoid unequal division of voltage and changes in division of voltage in a grading capacitor which would result from unequal stray capacitances or from variations in stray capacitances by contamination of the exterior surfaces of a ceramic apparatus housing.

Still another object of the invention is to obtain these advantages in a pothead or terminal structure for a high voltage cable.

Still another object of the invention is to provide a voltage divider in which the measuring capacitance is shielded from the field of the cable conductor and to render it possible to calibrate the voltage divider in the factory.

Other and further objects, features and advantages of the invention will become apparent as the description proceeds.

In carrying out the invention in accordance with one form thereof, a hollow ceramic housing is employed such as in conventional high voltage apparatus. Axially stacked, serially connected capacitor elements are mounted within the housing with end terminals connected to terminal members attached to the ends of the insulator housing. The voltage between such terminal members may be measured without direct connection thereto by bringing electrical connections from the plates of one of the capacitor elements at which a voltage appears constituting a predetermined fraction of the entire voltage of the apparatus. Stray external field effects are avoided by shielding the stack of capacitor elements. This is accomplished by mounting a second stack of capacitor elements concentrically with the first between the inner surface of the hollow insulator housing and an insulating tube surrounding the first stack of capacitor elements. The shielding stack has end terminals connected in parallel with the end terminals of the first stack of voltage divider capacitors.

According to another embodiment of the invention, shielding of the voltage-divider grading capacitors from the field of the conductor of an electrical cable passing through the insulator housing, when it is used as a pothead, may also be accomplished by providing a stack of shielding capacitors concentrically between the cable and the stack of grading capacitors. Such arrangements are useful particularly in cable terminating apparatus, potheads and the like.

A better understanding of the invention will be afforded by the following detailed description considered in conjunction with the accompanying drawing in which.

Like reference characters are utilized throughout the drawing to designate like parts.

Figures 1, 3:
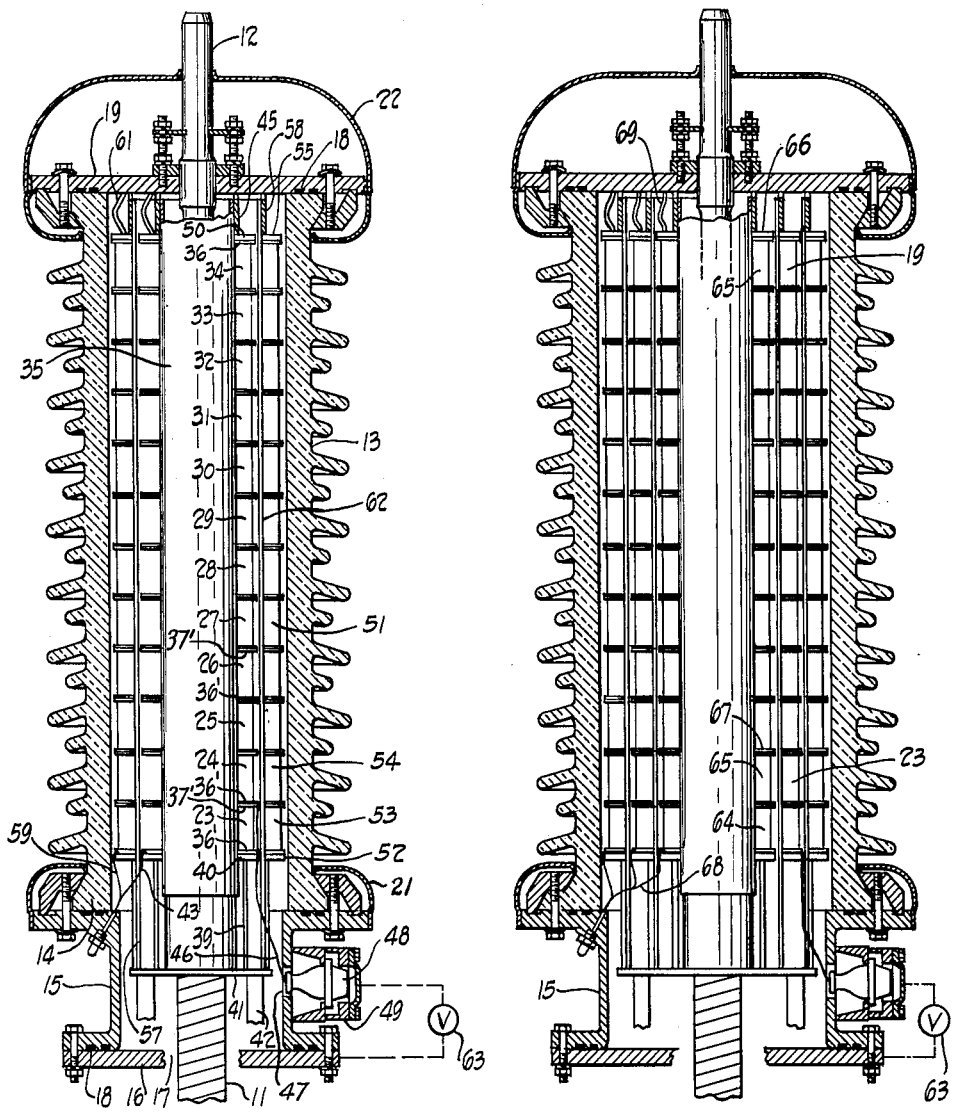
FIG. 1 is a view in longitudinal section of an embodiment of the invention used as a high voltage cable terminator or pothead with a voltage divider arranged to be shielded from external fields.
FIG. 3 is a view in longitudinal section corresponding to FIG. 1 in which a voltage divider is shielded from the field of the conductor of a high voltage cable as well as from external fields or unequal capacity effects.
Figure 2:
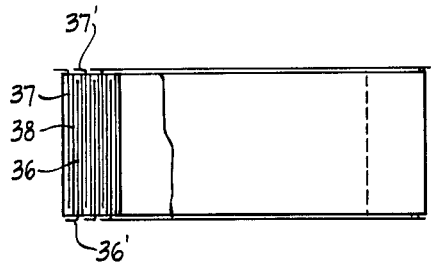
FIG. 2 is a detailed view in longitudinal section of one of the capacitor elements.

In the embodiment of FIG. 1 a pothead is shown for an insulated high-voltage electrical cable 11 having a cable conductor 12. The pothead comprises a hollow housing 13 preferably composed of conventional ceramic insulating material and of the skirted type employed in high-voltage apparatus. The insulator housing 13 has a conventional flared foot 14 for enabling it to be clamped to a supporting ring 15 which is, in turn, bolted to the wall 16 of the casing of electrical apparatus such as an oil-filled transformer, oil-circuit breaker, or the like having an opening 17 through which the cable 11 passes. Where high-voltage insulation is accomplished by filling the pothead with gas or oil, under pressure, in addition to the solid insulation employed, it will be understood that suitable sealing means such as gaskets 18 are provided; however, the invention is not limited to use in insulating housings of the pressure type. Where voltage measurements are to be made with respect to ground, the ring 15 serves as a ground terminal.

For supporting the projecting end of the cable conductor 12 a cap 19 is provided which is also suitably clamped to the upper end of the insulator housing 13 and in the case of high-pressure installations is suitably sealed by gaskets 18 or the like. The cap 19 is electrically connected to the projecting end of the cable conductor 12 and serves as a high-voltage terminal.

Conventional corona guards 21 and 22 may be provided, which serve also as arcing rings.

A voltage divider of the condenser type is provided for distributing or guiding electrical stresses in the insulation of the cable 11 and in an insulator tube 35, and for enabling a voltage to be tapped off which is a fraction of the voltage between the grounded terminal member 15 and the cap or high voltage terminal 19, a voltage divider of the grading condenser type is provided. This consists of a series of annular capacitor elements 23 to 34 stacked within the insulator housing 13. Such a capacitor stack may be assembled as shown by mounting the capacitor elements 23 to 34 within the insulator housing 13 concentric therewith and surrounding and supported by the insulator tube 35 surrounding the insulated cable 11.

Each of the capacitor elements 23 to 34 comprises interleaved layers of metallic foil 36 and 37, separated by insulating layers 38, all wrapped around an insulating tubular form. The edges of alternate foil layers are brought out around the opposite edges of insulating layers 38 to form capacitor terminals 36' and 37'. The abutment of such terminals 36' and 37' of adjacent capacitor elements serves to connect them in series. Annular metallic discs 40 and 50 may be provided at the lower and upper ends of the capacitor stack for supporting the capacitors more securely and for facilitating the connection between the capacitor foils.

Annular metallic discs may be similarly provided between the terminals 36' and 37' of adjacent capacitors.

The capacitors 23 to 34 are supported one above the other. For supporting the lowermost capacitor and the electrically conducting member 40 suitable means such as a hollow insulating cylinder 39 is provided which, in turn, rests upon an insulating annulus 41 resting upon a hollow cylinder 42 supported by structure not shown. For electrically connecting the lower end of the stack of voltage dividing capacitors an electrical conductor 43 is provided which is electrically connected to the ground terminal member 15. Likewise for electrically connecting the uppermost electrically conducting member 50 of the voltage divider stack to the high voltage terminal or cap 19 a second electrical conductor 44 is provided, which is shown in the form of braid or the like with ends soldered or brazed to the members 50 and 19 respectively. Preferably a spacing insulator tube 45 is also provided to fix the distance between the members 50 and 19 and to maintain the terminals 36' and 37' of the successive capacitor elements in close contact.

A predetermined fraction of the entire high tension voltage between the terminal members 15 and 19 is tapped off for application to low-voltage volt meters, recorders, or other low voltage apparatus such as relays and the like by making connections across one of the capacitor elements such as across the element 23 for example. As shown, an electrical conductor 46 is provided which is connected to the terminal 37' of capacitor element 23. The electrical conductor 43 which grounds the lower end of the capacitor element 23 to the grounded terminal member 15 serves as a common ground in this case for the apparatus with which the pothead is used and the low voltage measuring or other low voltage responsive apparatus. An electrical connection for the low voltage responsive apparatus is brought out by the conductor 46 through an opening 47 in the side wall of the grounded terminal member 15 and through an insulator bushing 48 mounted in a housing assembly 49 secured to the outer side wall of the grounded terminal member 15.

For accurate voltage measurement by an instrument connected between the terminal member 15 and the voltage tap conductor 46 it is important that the capacity of the capacitor across which such an instrument is connected bear a predetermined fixed and constant relationship to the total series capacitance of the capacitor stack between the electrical conductors 43 and 44. This relationship may be affected by inequality or variations of capacitances between ground and parts of the structure, particularly in the event that some portions of the external surface of the ceramic insulator housing 13 should become contaminated with electrically conducting material or with a material having a markedly different specific inductive capacity from the ceramic material of which the housing 13 is composed.

In order to obviate the possibility of such effects altering the voltage ratio of the voltage divider after it has been calibrated and to assure a greater degree of uniformity of voltage ratio in different potheads of the same size and design, means are provided for shielding the voltage divider capacitor stack from external electrostatic fields. This assures equal voltage division in the voltage divider, not only for measurement purposes but also for accomplishing the best distribution of stresses in the insulation of the cable 11. Shielding from external or stray electrostatic fields or from variations in capacitance to ground effects is accomplished in the embodiment of FIG. 1 by providing a second stack 51 of capacitor elements similar to the stack including the capacitor elements 23 to 34, concentric with the first stack and surrounding it within the insulator housing 13.

Such a shielding capacitor stack 51 comprises coaxially stacked elements similar to those of the voltage divider stack including a conducting annulus 52, a capacitor element 53 corresponding to the element 23 surrounding and concentric therewith, a plurality of capacitor elements 54 corresponding to the elements 24 and 34, inclusive, concentric therewith, and an uppermost conducting annulus 55 concentric with and surrounding the annulus 50. Likewise a supporting hollow cylinder 57 is provided and a spacing and securing hollow cylindrical insulator 58 is provided corresponding to the hollow insulator 45. The lower terminal 36' of the lowermost capacitor elements 53 is electrically connected to the grounded terminal member 15 by means of a conductor 59 corresponding to the conductor 43 and the uppermost electrically conducting annulus 55 is connected to the high tension terminal or cap member 19 by a flexible or braided conductor 61 corresponding to the conductor 44. An insulating fiber spacer cylinder 62 is provided for separating the two concentric capacitance stacks. The arrangement permits accurate measurement of voltage between the terminal member 15 and the terminal member 19 by a schematically indicated low voltage instrument 63.

In capacitor type potheads it is also desirable to shield the capacitor used as a voltage divider from the field of the cable conductor to make it possible to calibrate the voltage divider in the factory. An arrangement for accomplishing this is illustrated in FIG. 3. The construction is similar to that of FIG. 1 except that a stack of capacitors is mounted between the insulating tube 35 which surrounds the cable 11 and the voltage divider stack of capacitors 23–34. As shown the inner shielding stack of capacitors comprises a capacitor element 64 above which are mounted a series of similar elements 65 surmounted by a conducting annulus 66. The lowermost capacitor element 64 is electrically connected to the ground terminal element 15 by means of a conductor 68 and the electrically conducting annulus 66 is connected electrically to the high tension terminal or cap 19 by means of a flexible conductor or braid 69.

Figure 4:
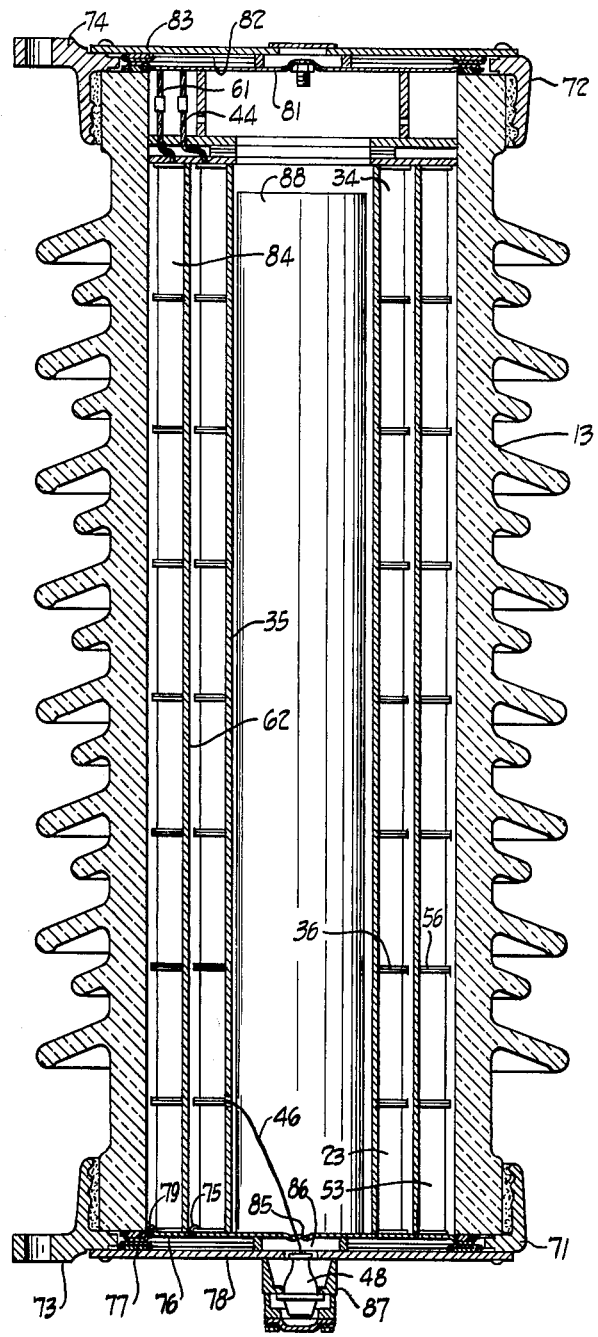
FIG. 4 is a view in longitudinal section of a coupling capacitor for use where only an indication of system voltage is required.

The invention is not limited to use in potheads and may also be used in other applications such as in coupling capacitors where only an indication of system voltage is required. In the embodiment of FIG. 4 a dual capacitor stack is mounted within a ceramic housing 13. The ceramic housing 13 is provided with high tension terminals and supporting members 71 and 72 provided with apertured terminal lugs 73 and 74 through which bolt connections may be made. The capacitor stacks correspond with those illustrated in FIG. 1. The lowermost capacitor element 23 is connected to the terminal 73 through a conductor 75, a contact plate 76 and a contact ring 77, which contacts a lower end plate 78 secured in electrical contact with the terminal 73. The lowermost capacitor element 53 is likewise connected to the terminal 73 through a conductor 79 and the elements 76, 77 and 78. The upper capacitor element 34 of the voltage divider stack is electrically connected to the terminal 74 through a conductor 44, a metallic sealing cap 81, an annular conductor plate 82 and a top end plate 83. The uppermost capacitor element 84 of the shielding stack of capacitor units is likewise electrically connected to the terminal 74 through the conductor 61 and the elements 81, 82 and 83.

For tapping off a fractional voltage to a suitable low voltage responsive device, a voltage tap conductor 46 is provided, as in the embodiment of FIG. 1, and brought from the top terminal 37' of the capacitor element 23 through an opening 85 in the bottom sealing cap 76 and opening 86 in the bottom end plate 78 to the insulating bushing 48. The bushing 48 is mounted in a housing 87 secured to the bottom end plate 78 around the opening 86 and joined thereto so as to form a pressure seal to permit the use of insulating gas or liquid within the assembly mounted in the housing 13. Preferably a porcelain centering rod 88 is mounted within the inner tube 35.

Other modes of applying the principle of this invention may be employed instead of those specifically set forth above, changes being made as regards the details herein disclosed provided the elements set forth in any of the following claims, or the equivalent of such be employed.

It is, therefore, particularly pointed out and distinctly claimed as the invention:

1. A shielded capacitance voltage divider means comprising, in combination, first and second stacks of annular capacitors, each capacitor comprising concentrically wound foils extending in the axial direction of the said stacks, and the second stack being arranged concentrically about the first stack for shielding the first stack, each capacitor of each stack being concentric with the others, series connections between the capacitors of each stack with end terminals for each stack for connection to a voltage source, and a tap connected to one of the capacitors of the first stack, the potential difference between said tap and one of said terminals bearing a predetermined ratio to the voltage across the terminals.

2. A shielded capacitance voltage divider means comprising, in combination, first and second stacks of annular capacitors, each capacitor comprising concentrically wound foils extending in the axial direction of the said stacks, coaxially with the other capacitors and the second stack being arranged concentrically about the first stack for shielding the first stack from stray capacitance effects, and series connections between the capacitors of each stack with end terminals for each stack.

3. A high voltage cable terminal comprising in combination a hollow cylindrical insulator housing having electrically conducting terminal members mechanically connected to the ends thereof, one terminal member having means electrically connecting it to the conductor of an electric cable passing concentrically through the housing, a hollow insulating cylinder mounted within said housing adapted to confine an insulated cable passing through the housing, first and second concentric sets of annular capacitor elements coaxial with said insulating cylinder, means electrically and mechanically separating the first and second sets of capacitor elements, the elements of each set being stacked axially and serially connected to provide separate voltage dividing and grading means, one end of each set being connected to one of said terminal members and the other end of each set being connected to the other of said terminal members.

4. A high voltage cable terminal comprising in combination a hollow cylindrical insulator housing having electrically conducting terminal members mechanically connected to the ends thereof, one terminal member having means electrically connecting it to the conductor of an electric cable passing concentrically through the housing and the other having an opening for passage of the cable therethrough, a hollow insulating cylinder mounted within said housing adapted to confine an insulated cable passing through the housing, first and second concentric sets of annular capacitor elements coaxial with said insulating cylinder, means electrically and mechanically separating the first and second sets of capacitor elements, the elements of each set being stacked axially in electrically contacting relation to provide serially connected grading capacitances, one end of each set being connected to one of said terminal members and the other end of each set being connected to the other of said terminal members.

5. A high voltage cable terminal comprising in combination a hollow insulating housing in hollow cylindrical form with a terminal member secured to one end having means electrically connecting it to an end of an insulated electrical cable passing through the insulator housing and a terminal member secured to the opposite end of the insulator housing having an opening therein permitting the insulated cable to pass therethrough, an insulating tube mounted coaxially within said insulator housing of such internal diameter as to be adapted to embrace an insulated cable with which the insulator housing is to be used, a plurality of capacitor stacks concentric with said insulator tube, each stack consisting of a plurality of serially connected annular capacitors concentric with said insulator tube and with end terminals connected respectively to the first and second terminal members secured to the ends of the insulator housing, hollow cylindrical insulator means separating the capacitor stacks from each other and means for making electrical connections to one of the serially connected condensers of one of the concentric condenser stacks for obtaining a voltage which is a fraction of the voltage between the terminal elements at the ends of the insulator housing, the capacitor stack from which such fractional voltage connections are taken being shielded from stray capacitative effects by the capacitor elements other than those in said capacitor stack, whereby shielding from external fields is provided.

6. A shielded high voltage capacitor comprising a first set of a plurality of annular capacitor elements stacked coaxially in electrical series connection, and a second set of a plurality of annular capacitor elements stacked coaxially in electrical series connection, each concentric with the first set of elements, the elements of the first set each having a greater internal diameter of the elements than the external diameter of the elements of the second set, having substantially the same axial extent as the other set and the second set being coaxial with the first set and within it.

References Cited by the Examiner
UNITED STATES PATENTS

| | | | |
|---|---|---|---|
| 1,658,501 | 2/28 | Valle | 317—260 |
| 1,868,962 | 7/32 | Atkinson | 174—73 |
| 1,991,707 | 2/35 | Silbermann | 317—260 |
| 2,068,624 | 1/37 | Atkinson | 174—73 |
| 2,079,071 | 5/37 | Keinath | 317—242 X |
| 2,107,132 | 2/38 | Smith | 317—260 |
| 2,119,113 | 5/38 | Olving | 317—260 |
| 2,161,326 | 6/39 | Webb | 317—260 |

SAMUEL BERNSTEIN, JOHN F. BURNS, Examiners.

LARAMIE E. ASKIN, Primary Examiner.